(12) United States Patent
Pontiller-Schymura et al.

(10) Patent No.: US 11,911,959 B2
(45) Date of Patent: Feb. 27, 2024

(54) DEVICE FOR ADDITIVE PRODUCTION OF THREE-DIMENSIONAL OBJECTS

(71) Applicant: CL SCHUTZRECHTSVERWALTUNGS GMBH, Lichtenfels (DE)

(72) Inventors: Peter Pontiller-Schymura, Neudrossenfeld (DE); Felix Trutschel, Küps (DE); Tim Döhler, Großheirath (DE)

(73) Assignee: Concept Laser GmbH, Lichtenfels (DE)

( * ) Notice: Subject to any disclaimer, the term of this patent is extended or adjusted under 35 U.S.C. 154(b) by 631 days.

(21) Appl. No.: 15/916,855

(22) Filed: Mar. 9, 2018

(65) Prior Publication Data

US 2018/0257140 A1 Sep. 13, 2018

(30) Foreign Application Priority Data

Mar. 9, 2017 (DE) .......................... 102017105056.6

(51) Int. Cl.
  *B22F 3/105* (2006.01)
  *B29C 64/153* (2017.01)
  (Continued)

(52) U.S. Cl.
  CPC ............ *B29C 64/153* (2017.08); *B22F 10/28* (2021.01); *B22F 10/362* (2021.01);
  (Continued)

(58) Field of Classification Search
  CPC .... B23K 26/342; B29V 64/368; B29C 64/277
  See application file for complete search history.

(56) References Cited

U.S. PATENT DOCUMENTS

| 5,393,482 A * | 2/1995 | Benda ................... B29C 64/153 |
|  |  | 419/1 |
| 10,285,222 B2 * | 5/2019 | Jakimov ............... B22F 3/1055 |

(Continued)

FOREIGN PATENT DOCUMENTS

| CN | 104136149 B | 8/2016 |
| CN | 105188994 B | 2/2018 |

(Continued)

OTHER PUBLICATIONS

Machine Translated Chinese Office Action Corresponding to Application No. 201710772445 dated Dec. 4, 2019.

(Continued)

*Primary Examiner* — Justin C Dodson
(74) *Attorney, Agent, or Firm* — Dority & Manning, P.A.

(57) ABSTRACT

A device (1) for the additive production of three-dimensional objects (2) by successive, layered, selective irradiation and accompanying successive, layered, selective solidification of construction material layers of a construction material (3) that can be solidified by means of an energy beam, comprising: a plurality of irradiation devices (6 and 7), which are designed to generate an energy beam, a control device (16), which is designed to generate control information controlling the operation of the irradiation devices (6 and 7) and to control the operation of the irradiation devices (6 and 7) on the basis of generated control information, wherein the control device (16) is designed to generate first control information in order to control the operation of a first irradiation device, on the basis of which the first irradiation device generates a first energy beam (4a) for the successive, layered, selective solidification of a construction material layer.

11 Claims, 3 Drawing Sheets

Figure 1:
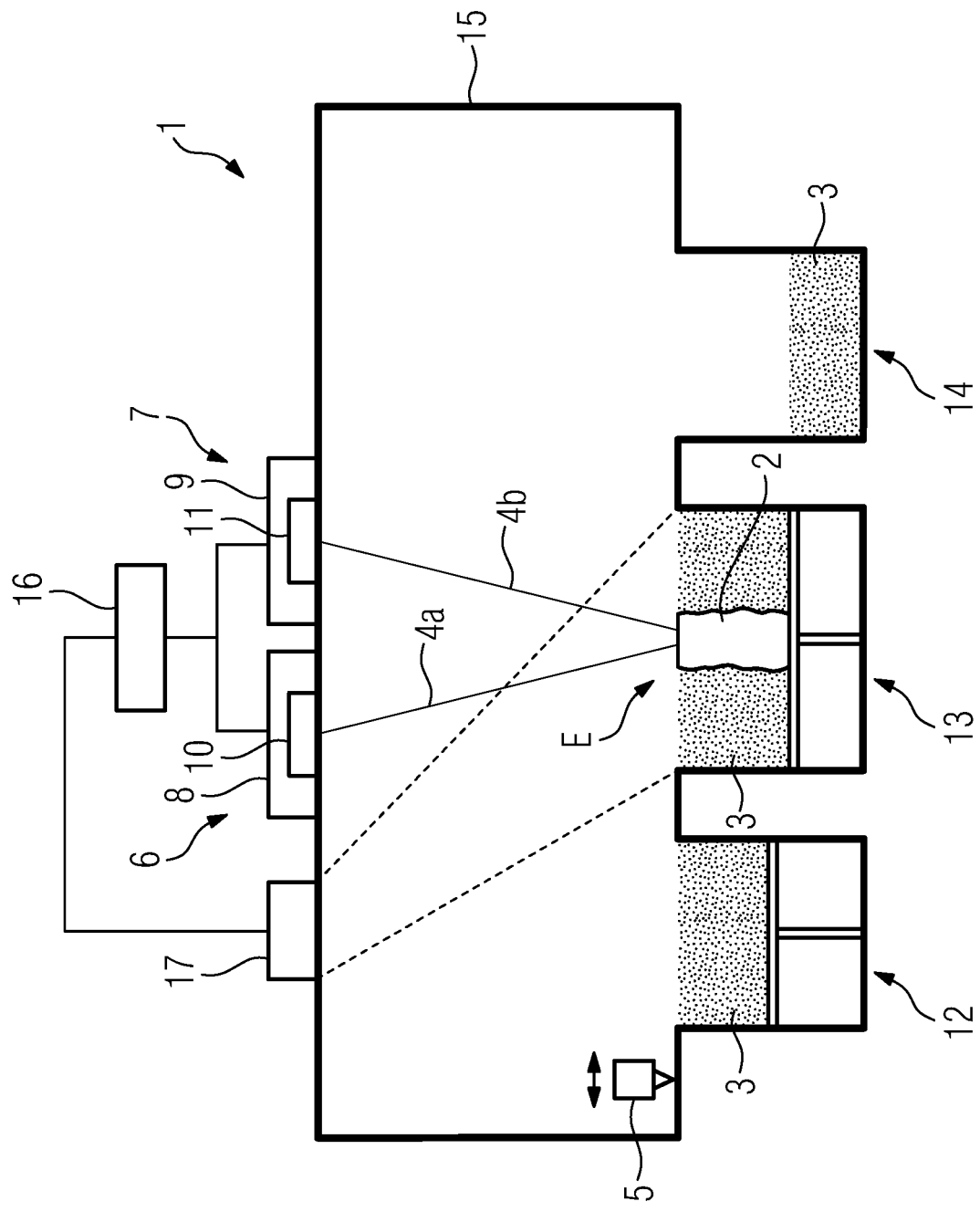

(51) Int. Cl.
    *B33Y 10/00*     (2015.01)
    *B33Y 30/00*     (2015.01)
    *B29C 64/364*     (2017.01)
    *B29C 64/277*     (2017.01)
    *B22F 10/28*     (2021.01)
    *B22F 12/13*     (2021.01)
    *B22F 12/45*     (2021.01)
    *B22F 10/362*     (2021.01)
    *B22F 10/364*     (2021.01)
    *B23K 26/082*     (2014.01)
    *B29C 64/393*     (2017.01)
    *B22F 12/49*     (2021.01)
    *B22F 12/90*     (2021.01)
    *B22F 10/36*     (2021.01)
    *B33Y 50/02*     (2015.01)

(52) U.S. Cl.
    CPC ............ *B22F 10/364* (2021.01); *B22F 12/13* (2021.01); *B22F 12/45* (2021.01); *B23K 26/082* (2015.10); *B29C 64/277* (2017.08); *B29C 64/364* (2017.08); *B29C 64/393* (2017.08); *B33Y 10/00* (2014.12); *B33Y 30/00* (2014.12); *B22F 10/36* (2021.01); *B22F 12/49* (2021.01); *B22F 12/90* (2021.01); *B22F 2203/11* (2013.01); *B33Y 50/02* (2014.12)

(56) References Cited

U.S. PATENT DOCUMENTS

| | | | | |
|---|---|---|---|---|
| 10,583,530 | B2* | 3/2020 | Karp | B22F 10/20 |
| 2005/0237895 | A1* | 10/2005 | Tanaka | H01L 21/02532 |
| | | | | 369/47.36 |
| 2007/0108170 | A1* | 5/2007 | Costin, Sr. | B44C 1/005 |
| | | | | 219/121.85 |
| 2013/0064706 | A1 | 3/2013 | Schwarze et al. | |
| 2013/0108726 | A1* | 5/2013 | Uckelmann | B33Y 50/02 |
| | | | | 425/174.4 |
| 2014/0271328 | A1* | 9/2014 | Burris | B33Y 10/00 |
| | | | | 419/53 |
| 2015/0064048 | A1 | 3/2015 | Bessac et al. | |
| 2016/0114432 | A1* | 4/2016 | Ferrar | B22F 12/00 |
| | | | | 219/76.12 |
| 2016/0158889 | A1* | 6/2016 | Carter | B29C 73/34 |
| | | | | 219/76.12 |
| 2016/0236299 | A1* | 8/2016 | Oberhofer | B29C 64/295 |
| 2016/0250717 | A1* | 9/2016 | Kruger | B23K 26/342 |
| | | | | 219/76.1 |
| 2017/0008126 | A1* | 1/2017 | Long | B22F 10/28 |
| 2017/0021455 | A1* | 1/2017 | Dallarosa | B29C 64/268 |
| 2017/0120337 | A1* | 5/2017 | Kanko | B22F 3/1055 |
| 2017/0145586 | A1* | 5/2017 | Xiao | B33Y 30/00 |
| 2017/0157850 | A1 | 6/2017 | Duan et al. | |
| 2017/0173737 | A1* | 6/2017 | Gray | B33Y 30/00 |
| 2017/0239724 | A1* | 8/2017 | Diaz | B23K 26/342 |
| 2018/0141160 | A1* | 5/2018 | Karp | B23K 26/04 |
| 2018/0207750 | A1* | 7/2018 | Carter | B22F 12/45 |
| 2018/0272460 | A1* | 9/2018 | Nelson | B22F 3/1055 |
| 2018/0326655 | A1* | 11/2018 | Herzog | B22F 12/00 |

FOREIGN PATENT DOCUMENTS

| | | |
|---|---|---|
| DE | 102010048335 A1 | 4/2012 |
| DE | 102013205029 A1 | 9/2014 |
| JP | 2015193883 A | 11/2015 |
| WO | WO2016075803 A | 5/2016 |
| WO | 2016096407 A1 | 6/2016 |

OTHER PUBLICATIONS

European Search Results Corresponding to Application No. 17180166 dated Feb. 21, 2018.

European Search Opinion Corresponding to Application No. 17180166.5 dated Feb. 28, 2018.

German Search Results Corresponding to Application No. 102017105056.6 dated Mar. 26, 2019.

Japanese Office Action Corresponding to Application No. 2017243678 dated Jan. 4, 2019.

* cited by examiner

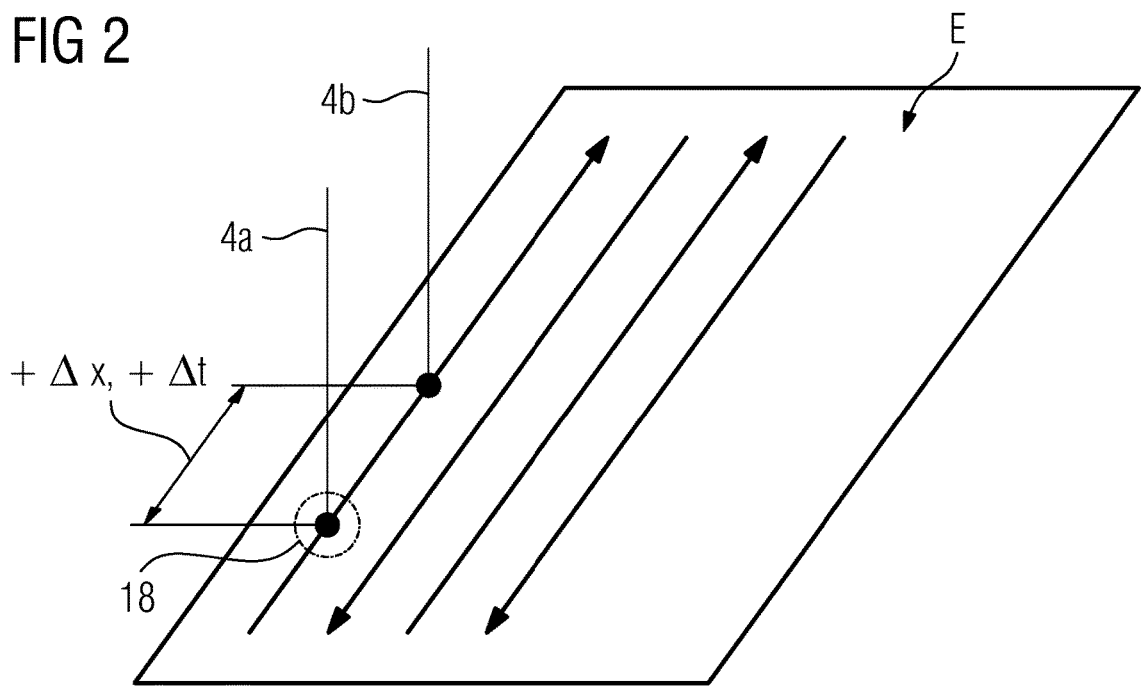
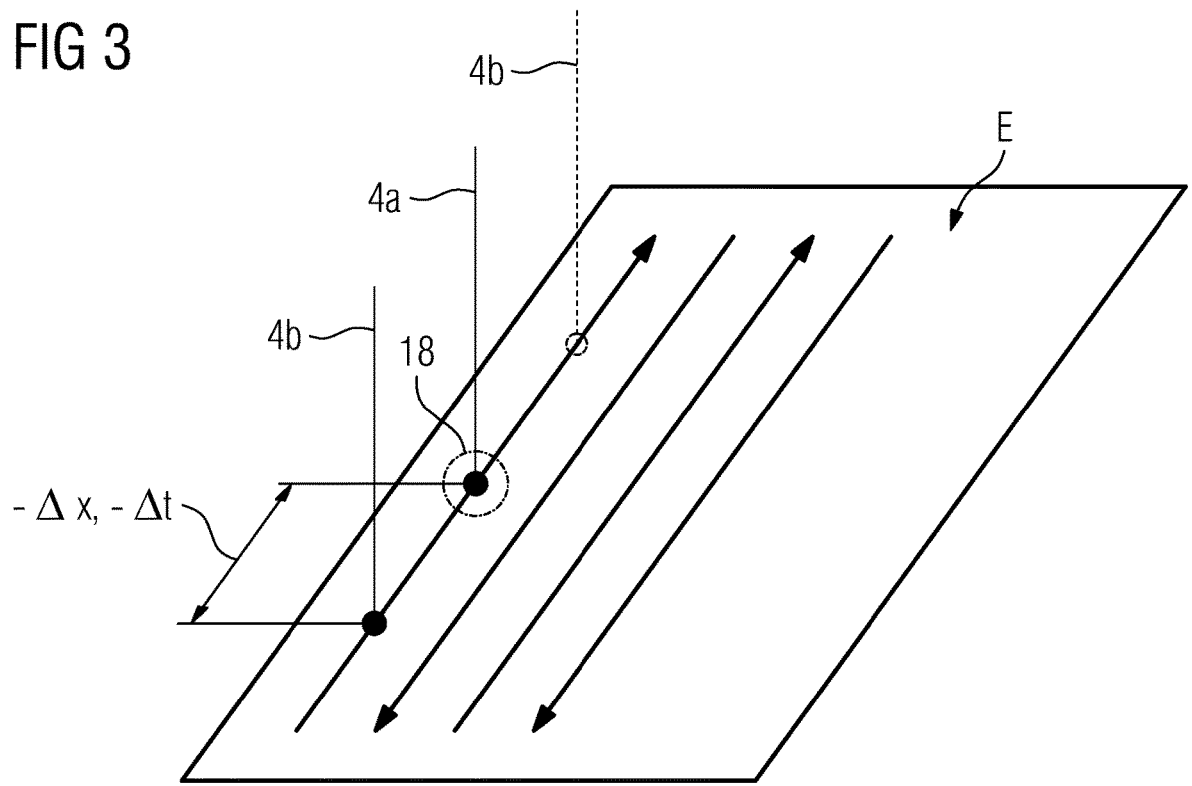

$-\Delta x, -\Delta t$
$+\Delta x, +\Delta t$

US 11,911,959 B2

DEVICE FOR ADDITIVE PRODUCTION OF THREE-DIMENSIONAL OBJECTS

CROSS-REFERENCE TO RELATED APPLICATIONS

This application claims priority to German Patent Application serial no. 10 2017 105 056.6 filed Mar. 9, 2017, the contents of which are incorporated herein by reference in their entirety as if set forth verbatim.

DESCRIPTION

The invention relates to a device for the additive production of three-dimensional objects by successive, layered, selective irradiation and accompanying successive, layered, selective solidification of construction material layers of a construction material that can be solidified by means of an energy beam, comprising a plurality of irradiation devices, each of which are designed to generate at least one energy beam, and a control device, which is designed to generate control information controlling the operation of the irradiation devices and to control the operation of the irradiation devices on the basis of generated control information.

Devices for additive production of three-dimensional objects are generally known. By means of corresponding devices, three-dimensional objects to be produced are additively structured by successive, layered, selective irradiation and accompanying successive, layered, selective solidification of construction material layers in the regions corresponding to the layer-based cross-section of the object to be produced from a construction material that can be solidified by means of an energy beam.

It is furthermore known that temperature control of construction material layers that are to be selectively solidified or that are selectively solidified is expedient in order to implement the most optimal properties of respective objects to be additively produced. Corresponding temperature control can contribute to the reduction of gas porosity, for example, that is, particularly hydrogen porosity, in the case of typically pre-dried, hygroscopic construction materials, that is, for example, aluminum.

In the prior art, temperature control of construction material layers that are to be selectively solidified or that are selectively solidified normally occurs via heating elements, that is, resistance heating elements, for example, integrated in a construction module defining a construction chamber. The heating elements can be integrated in a floor plate of the construction module delimiting the construction chamber on the floor side, for example. The thermal energy introduced into the construction chamber in planar manner via the heating elements provides for a certain temperature control of the construction material that is located in the construction chamber and that is pre-dried as applicable.

This principle of temperature control is in need of further development in a plurality of respects; particularly because it enables no pre-drying of the construction material and no local temperature control of the construction material. Moreover, the temperature control of the construction material by means of corresponding heating elements is restricted to a temperature threshold which can be too low in consideration of the processing of new kinds of materials, particularly high melting point materials.

The problem to be solved by the invention is therefore that of specifying a comparatively improved device for additive production of three-dimensional objects.

This problem is solved by a device for additive production of three-dimensional objects according to the claims. The claims dependent on said claims relate to possible embodiments of the device.

The device described herein ("device") is designed for the additive production of three-dimensional objects, that is, for example, technical components or technical component groups, by successive, layered, selective irradiation and accompanying successive, layered, selective solidification of construction material layers of a construction material that can be solidified in the construction material layer regions corresponding to the layer-based cross-section of the respective object to be produced. The construction material can be a particulate or powdery metal, plastic and/or ceramic material. The selective solidification of construction respective material layers to be solidified occurs on the basis of object-based construction data. Corresponding construction data describe the geometric design of the respective object to be additively produced and can, for example, include "sliced" data of the object to be additively produced.

The device can be designed as a device for carrying out selective laser melting processes (abbreviated as SLM process), for example, or as a device for carrying out selective laser sintering processes (abbreviated as SLS process). It is also conceivable that the device can be designed as a device for carrying out selective electron beam melting processes (abbreviated as SEBS process).

The device comprises the functional components typically required for carrying out additive construction processes. These particularly include a coating device and at least one irradiation device. A corresponding coating device is designed to form construction material layers to be selectively solidified in a construction plane of the device, in which the successively layered selective irradiation and the associated successively layered selective solidification of construction material layers take place, and typically comprises a coating element, which is particularly blade-like or blade-shaped, and is movably borne relative to the construction plane. A corresponding irradiation device is designed for the selective irradiation of construction material layers to be selectively solidified in the construction plane of the device and typically comprises an energy beam generation device, which is designed to produce an energy beam, and an energy beam deflection device, as applicable, also designated as or considered to be a scanner device, which is designed to deflect an energy beam to respective construction material layers.

The device described herein comprises a plurality of irradiation devices. Each irradiation device comprises an energy beam generation device designed to generate an energy beam, that is, particularly a laser beam, of definable energy beam properties. Each irradiation device can furthermore comprise an energy beam deflection device designed to deflect the energy beam generated by the energy beam generation device thereof to regions of respective construction material layers to be selectively irradiated or selectively solidified. It is also conceivable that a (single) energy beam deflection device is allocated to the respective energy beam generation devices of different irradiation devices, wherein the energy beam deflection device is designed to deflect the energy beams generated by the energy beam generation devices allocated thereto to respective regions that are to be selectively irradiated or selectively solidified of respective construction material layers.

The device comprises a control device implemented by means of hardware and/or software. The control device can be allocated or is allocated in terms of control technology to the irradiation devices and is designed to generate control information controlling the operation of the irradiation devices and to control the operation of the irradiation devices on the basis of correspondingly generated control information. The control of the operation of respective irradiation devices particularly includes the control of energy beam properties of a generated energy beam, that is, for example, the energy beam intensity and/or the energy beam focus diameter, and the control of the movement properties of a generated energy beam, that is, for example, a trajectory along which an energy beam moves over a construction material layer to be selectively solidified, or certain movement parameters in connection with a movement of the energy beam, such as the movement velocity at which an energy beam is moved over a construction material layer to be selectively solidified.

The control device is, as shown in the following, designed to generate different control information for different irradiation devices, so that the energy beams generated by different irradiation devices differ by individual or a plurality of energy beam properties and/or by individual or a plurality of movement properties.

Specifically, the control device is designed to generate first control information in order to control the operation of at least one first irradiation device, on the basis of which the first irradiation device generates a first energy beam for the successive, layered, selective solidification of a construction material layer. An irradiation device defined by the control device as a first irradiation device is activated or operated by the control device on the basis of an activation based on first control information to generate an energy beam for successive, layered, selective solidification of a construction material layer. Of course, a plurality of irradiation devices can be defined or operated by the control device as first irradiation devices, which are each activated or operated by the control device on the basis of an activation based on first control information to generate an energy beam for successive, layered, selective solidification of a construction material layer.

The control device is furthermore designed to generate second control information in order to control the operation of at least one second irradiation device, on the basis of which the second irradiation device generates a second energy beam for the thermal pre-treatment of a construction material layer to be selectively solidified, particularly in a region of the construction material layer to be selectively solidified, and/or a second energy beam for the thermal post-treatment of a construction material layer to be selectively solidified, particularly in a region of the construction material layer to be selectively solidified. An irradiation device defined by the control device as a second irradiation device is activated or operated by the control device on the basis of an activation based on second control information to generate an energy beam for the thermal pre-treatment of a construction material layer to be selectively solidified, particularly in a region of the construction material layer to be selectively solidified, and/or an energy beam for the thermal post-treatment of a construction material layer to be selectively solidified, particularly in a region of the construction material layer to be selectively solidified. Of course, a plurality of irradiation devices can be defined or operated by the control device as second irradiation devices, which are each activated by the control device on the basis of an activation based on second control information to generate an energy beam for the thermal pre-treatment of a construction material layer to be selectively solidified and/or for the thermal post-treatment of a construction material layer to be selectively solidified.

The device thus makes it possible to selectively "allocate" different irradiation devices with different functions on the basis of corresponding control information generated by the control device. At least one irradiation device can be defined or operated as a first irradiation device, so that it generates an energy beam for the selective solidification of a construction material layer, at least one other irradiation device can be defined or operated as a second irradiation device, so that it generates an energy beam for the thermal pre-treatment or post-treatment of a construction material layer. A thermal pre-treatment or post-treatment of a construction material layer is also designated in the following as temperature control of a construction material layer.

The possibility of using irradiation devices of the device for temperature control of construction material layers that is thus created allows for selective and local temperature control of construction material layers and selective control of the heating and cooling conditions or of a selective control of the melting and solidification conditions of the construction material, which is impossible with heating elements that are routine in the prior art. The selective control of the heating and cooling conditions or of the melting and solidification conditions can have active influence on the structural properties of an object to be produced, since a specific structure can be adjusted in this way. Likewise, pre-drying of the construction material is possible.

The possibility of using irradiation devices for temperature control of construction material layers furthermore allows that significantly less energy must be applied for temperature control of a construction material layer since no permanent and protracted temperature control of the entirety of the construction material located in the construction chamber is required.

The previously routine thermal stress on the construction chamber, functional components of the device that are thermally coupled to the construction chamber and object sections that are already additively structured and that are located within the construction chamber is reduced to a minimum by the selective local temperature control of a construction material layer, since the input of thermal energy for temperature control of the construction material can be restricted to the construction material regions to be temperature controlled. The thermal load on the construction material that is not solidified and that is to be reused or recovered, as applicable, is also reduced to a minimum. The construction material is thus not subject to any permanent temperature control, which, as has been shown based on experiments, can lead to an undesired rise in oxygen content in the construction material. Moreover, the formation of temperature gradients within or between different functional components of the device is reduced to a minimum, and therefore a "wandering" of individual functional components due to different thermal expansion of functional components is impossible, or hardly possible.

Overall, a device that is improved compared to the prior art described above is thus provided.

Before addressing additional embodiments of the device or the method that can be implemented therewith, it is observed that a respective definition of the irradiation devices as a first or second irradiation device can typically be varied; that is, is in no way permanently specified. The control device can thus be designed to define at least one specific irradiation device as a first irradiation device, as part of the selective solidification of a first construction material layer, and to define and accordingly operate the same irradiation device as part of the selective solidification of an additional construction material layer that is different from the first construction material layer, as a second irradiation device. The control device can also be designed to define at least one specific irradiation device as a first irradiation device, as part of the selective solidification of a first region of a construction material layer, and to define and accordingly operate the same irradiation device as part of the selective solidification of an additional region of the construction material layer that is different from the first region of the construction material layer, as a second irradiation device. An irradiation device can thus be used as part of the processing of one and the same construction process one or more times as a first irradiation device, that is, for the selective solidification of a construction material layer, and one or more times as a second irradiation device, that is, for temperature control of a construction material layer.

A "first irradiation device" in the following refers to an irradiation device of the device that is actuated or operated at least temporarily by the control device as a first irradiation device. In a similar manner, a "second irradiation device" in the following refers to an irradiation device of the device that is actuated or operated at least temporarily by the control device as a second irradiation device.

As shown in the following, the control device can be designed to generate second control information, on the basis of which the second energy beam generated by a second irradiation device can be guided or is guided along the same or a different trajectory over a construction material layer that is to be selectively solidified or is selectively solidified, like the first energy beam generated by a first irradiation device. A second irradiation device can thus be designed to generate a second energy beam, which can be guided or is guided along the same or a different trajectory over a construction material layer that is to be selectively solidified or is selectively solidified, like the first energy beam generated by a first irradiation device.

The control device can be particularly designed to generate second control information, on the basis of which a second energy beam generated by a second irradiation device can be guided or is guided leading or tailing a first energy beam generated by a first irradiation device, having a definable or defined, particularly synchronized local and/or temporal lead or tailing, along the same trajectory over a construction material layer that is to be selectively solidified or is selectively solidified, like the first energy beam generated by the first irradiation device. A second irradiation device can thus be designed to generate a second energy beam, which is guided leading or tailing a first irradiation device, along the same trajectory over a construction material layer that is to be selectively solidified or is selectively solidified, like the first energy beam generated by a first irradiation device.

Consequently, at least one second energy beam can be guided leading a first energy beam having a specific local and/or temporal lead along the same trajectory over a construction material layer, whereby a pre-temperature controlling that is selectively controllable, particularly by the specific local and/or temporal lead of the second energy beam, of the construction material that is to be solidified by the first energy beam results, such as for purposes of controlled influence or control of the heating or melting behavior of the construction material. A corresponding pre-temperature controlling in general enables a (local) pre-heating of the construction material, which allows for a processing particularly of high melting point construction materials or a drying of the construction material.

Alternatively or additionally, at least one second energy beam can be guided tailing a first energy beam having a specific local and/or temporal tailing along the same trajectory over a construction material layer, whereby a post-temperature controlling that is selectively controllable, particularly by the specific local and/or temporal tailing of the second energy beam, of the construction material that is to be solidified by the first energy beam results, such as for purposes of controlled influence or control of the cooling or solidification behavior of the construction material. A corresponding post-temperature controlling in general enables a reduction of mechanical tensions which may lead to crack formation and of gas or hydrogen porosity in the object, particularly by diffusion of gas pores.

The same applies for the case in which the device comprises a plurality of irradiation devices operable or operated as second irradiation devices. In this case, the control device can be designed to generate second control information, on the basis of which second energy beams generated by respective second irradiation devices can be guided or are guided leading or tailing a first energy beam generated by a first irradiation device, having a definable or defined, particularly synchronized local and/or temporal lead or tailing, along the same trajectory over a construction material layer that is to be selectively solidified or is selectively solidified, like the first energy beam generated by the first irradiation device. The device can thus comprise a plurality of second irradiation devices that are designed to generate a plurality of second energy beams, which can be guided or are guided leading or tailing a first energy beam generated by a first irradiation device, along the same trajectory over a construction material layer that is to be selectively solidified or is selectively solidified, like the first energy beam generated by the first irradiation device.

The control device can be designed to control the energy input, which is to be introduced or is introduced into a construction material layer, of second energy beams generated by respective second irradiation devices in dependence on the local and/or temporal lead or tailing of the respective second energy beams to the first energy beam generated by the first irradiation device. The energy input that is to be introduced or is introduced into the construction material layer by respective second energy beams is thus (nearly) arbitrarily variable, and therefore (nearly) arbitrarily variable or (nearly) arbitrarily varied temperature profiles, that is, evenly or unevenly rising or falling temperature ramps, can be implemented via a controlling of the respective energy input of respective second energy beams.

For example, the energy input, which is to be introduced or is introduced into a construction material layer, of a second energy beam, which has a comparatively larger local and/or temporal lead or tailing to a first energy beam generated by a first irradiation device, is smaller than the energy input, which is to be introduced or is introduced into the construction material layer, of an additional, second energy beam, which has a comparatively smaller local and/or temporal lead or tailing to the energy beam generated by the first irradiation device. An example possibility of the implementation of a certain temperature profile is thus given by means of which the heating or cooling properties of the construction material can be locally, selectively influenced.

A variant was described above according to which a movement of first and second energy beams occurs in one and the same trajectory, wherein at least one second energy beam is guided leading or tailing a first energy beam having a certain local and/or temporal lead or tailing.

A likewise conceivable variant, which is particularly combinable with the one described above, is described in the following, according to which a movement of first and second energy beams occurs in different trajectories, wherein at least one second energy beam is guided having a certain local and/or temporal offset laterally, particularly parallel, offset to a first energy beam.

The control device can thus be (alternatively or additionally) designed to generate second control information, on the basis of which the second energy beam generated by a second irradiation device can be guided or is guided over a construction material layer that is to be selectively solidified or is selectively solidified, having a definable or defined local and/or temporal offset laterally, particularly parallel, to a trajectory, along which the first energy beam generated by a first irradiation device can be guided or is guided over the construction material layer that is to be selectively solidified. A second irradiation device can thus be designed to generate a second energy beam, which is guided laterally offset to the first energy beam generated by a first irradiation device, that is, not in the same trajectory as the first energy beam generated by the first irradiation device, over a construction material layer that is to be selectively solidified or is selectively solidified.

At least one second energy beam can thus be guided having a specific local and/or temporal offset that is laterally offset to the trajectory of a first energy beam over a construction material layer, whereby a pre-temperature or post-temperature controlling that is selectively controllable, particularly by the specific local and/or temporal lateral offset of the second energy beam, of the construction material that is to be solidified or is solidified by the first energy beam results, such as for purposes of controlled influence or control of the heating or melting behavior of the construction material or the cooling or solidification behavior of the construction material.

The same applies in turn for the case in which the device comprises a plurality of irradiation devices operable or operated as second irradiation devices. In this case, the control device can be designed to generate second control information, on the basis of which the second energy beams generated by respective second irradiation devices can be guided or are guided over the construction material layer that is to be selectively solidified or is selectively solidified, having a definable or defined local and/or temporal offset that is offset laterally, particularly parallel, to a trajectory, along which a first energy beam generated by a first irradiation device can be guided or is guided over the construction material layer that is to be selectively solidified. The device can thus comprise a plurality of second irradiation devices that are designed to generate a plurality of second energy beams, which can be guided or are guided in a separate trajectory offset laterally to the first energy beam generated by a first irradiation device over a construction material layer that is to be selectively solidified or is selectively solidified.

Here, as well, the control device can be designed to control the energy input, which is to be introduced or is introduced into a construction material layer, of respective second energy beams generated by respective second irradiation devices in dependence on the local and/or temporal offset of the respective second energy beams to the trajectory of the first energy beam generated by the first irradiation device. The energy input that is to be introduced or is introduced into the construction material layer by respective second energy beams is also thus (nearly) arbitrarily variable, and therefore (nearly) arbitrarily variable or (nearly) arbitrarily varied temperature profiles, that is, evenly or unevenly rising or falling temperature ramps, can be implemented via a suitable controlling of the respective energy input of respective second energy beams.

For example, the energy input, which is to be introduced or is introduced into a construction material layer, of a second energy beam, which has a comparatively larger local and/or temporal offset to the trajectory of the first energy beam generated by the first irradiation device, is smaller than the energy input, which is to be introduced or is introduced into the construction material layer, of an additional, second energy beam, which has a comparatively smaller local and/or temporal offset to the trajectory of the energy beam generated by the first irradiation device. An example possibility of the implementation of a certain temperature profile is thus again given by means of which the heating or cooling properties of the construction material can be locally, selectively influenced.

Independently of whether a second energy beam is guided leading or tailing thereto or having a lateral offset relative to a first energy beam, it applies that a second energy beam can differ from a first energy beam in at least one energy beam parameter influencing the energy input of the energy beam into a construction material layer. A second energy beam can differ from a first energy beam, for example, in the energy beam intensity and/or the energy beam focus diameter, and/or the energy beam velocity at which the energy beam is guided over a construction material layer. The difference in the energy input typically occurs with the stipulation that the energy input of a second energy beam is so low that a melting of construction material is impossible with the second energy beam. A second energy beam consequently typically has a lower energy beam intensity and/or a larger energy beam focus diameter than a first energy beam.

The device can comprise a detection device, which is designed to detect at least one property of a construction material layer that is to be selectively solidified or is selectively solidified, particularly a region that is to be selectively solidified or is selectively solidified of a construction material layer that is to be selectively solidified or is selectively solidified, and to generate detection information describing the at least one detected property of the construction material layer that is to be selectively solidified or is selectively solidified. A corresponding property can be, for example, the temperature or the aggregate condition, particularly the molten state, of a region that is to be selectively solidified or that is selectively solidified, so that a local melting bath ("Meltpool") can be detected by the detection device. The detection device can be, for example, an optical detection device, that is, particularly a camera device, or the detection device can comprise at least one such device.

The control device can be designed to control at least one energy beam parameter, which influences the energy input of a respective energy beam into a construction material layer, of a second energy beam generated in dependence on a property, described by detection information, of a construction material layer that is to be selectively solidified or is selectively solidified. By means of properties of a construction material layer described by corresponding detection information, an even more precisely controlled influence or control of the heating or melting behavior or the cooling or solidification behavior of the construction material layer can be implemented by means of one or more second energy beams, particularly in real time.

In addition to the device, the invention relates to a method for the additive production of three-dimensional objects by successive, layered, selective irradiation and accompanying successive, layered, selective solidification of construction material layers of a construction material that can be solidified by means of an energy beam, particularly a laser beam, wherein a plurality of irradiation devices, each of which are designed to generate at least one energy beam having definable energy beam properties. The method is characterized in that at least one first irradiation device is operated on the basis of first control information generated by a control device in order to generate a first energy beam for the successive, layered, selective solidification of a construction material layer, and at least one second irradiation device on the basis of second control information generated by a control device in order to generate a second energy beam for the thermal pre-treatment of a construction material layer to be selectively solidified, particularly in a region of the construction material layer to be selectively solidified, and/or a second energy beam for the thermal post-treatment of a construction material layer to be selectively solidified, particularly in a region of the construction material layer to be selectively solidified. The method, which can be, for example, a selective laser melting process (abbreviated as SLM process), a selective laser sintering process (abbreviated as SLS process) or a selective electron beam melting process (abbreviated as SEBS process) can be carried out by means of a device as described. All comments in connection with the device apply analogously for the method, and vice versa.

The invention is explained in more detail based on embodiments in the figures. They show:

FIG. 1 a schematic diagram of a device according to an embodiment; and

FIGS. 2-5 each a schematic diagram of a plurality of energy beams guided over a construction material layer.

FIG. 1 shows a schematic diagram of a device 1 according to an embodiment. The device 1 serves for the additive production of three-dimensional objects 2, that is, for example, particularly technical components or technical component groups, by successive, layered, selective irradiation and accompanying successive, layered, selective solidification of construction material layers of a construction material 3, that is, a metal powder, for example, by means of an energy beam, that is, particularly a laser beam. The selective solidification of respective construction material layers to be solidified occurs on the basis of object-based construction data. Corresponding construction data describe the geometric design of the respective object 2 to be additively produced and can, for example, include "sliced" of the object 2 to be produced. The device 1 can be designed as a Laser-CUSING® device, for example, that is, as a device for carrying out selective laser melting processes (abbreviated as SLM process).

The device 1 comprises a coating device 5 as a functional component for carrying out additive construction processes. The coating device 5 is designed to form selectively exposed or selectively solidified construction material layers in a construction plane E of the device 1, and comprises for this purpose a coating element (not described in more detail), which is particularly blade-like or blade-shaped, and is movably borne relative to the construction plane E of the device 1.

The device 1 comprises a plurality, that is, two for example in the embodiment shown in FIG. 1, irradiation devices 6 and 7 as additional functional components for carrying out additive construction processes. Each irradiation device 6 and 7 comprises an energy beam generation device 8 and 9, designed to generate an energy beam 4a and 4b, that is, particularly a laser beam, of definable energy beam properties, and an energy beam deflection device 10 and 11, optically coupled thereto, designed to deflect an energy beam 4a and 4b to respective construction material layers. It would also be conceivable that a (single) energy beam deflection device is allocated to the respective energy beam generation devices 8 and 9 of different irradiation devices.

In the embodiment shown in FIG. 1, furthermore, a dosing module 12, a construction module 13 and an overflow module 14 are shown, which are docked to a lower region of a process chamber 15 of the device 1 that can be inertized. Said modules can also form a lower region of the process chamber 15 of the device 1.

The device 1 comprises a control device 16 associated with the irradiation devices 6 and 7 in respect of control technology and implemented by hardware and/or software. The control device 16 is designed to generate control information controlling the operation of the irradiation devices 6 and 7 and to control the operation of the irradiation devices 6 and 7 based on generated control information. The control of the operation of respective irradiation devices 6 and 7 particularly includes the control of energy beam and movement properties of an energy beam 4a and 4b generated by a respective irradiation device 6 and 7. The control device 16 is designed to generate different control information for different irradiation devices 6 and 7, so that the energy beams 4a and 4b generated by different irradiation devices 6 and 7 differ by individual or a plurality of energy beam properties and/or by individual or a plurality of movement properties.

The control device 16 is designed to generate first control information in order to control the operation of a first irradiation device, that is, the left irradiation device 6 in the figure, on the basis of which the first irradiation device generates a first energy beam 4a for the successive, layered, selective solidification of a construction material layer. The irradiation device 6 defined by the control device 16 as a first irradiation device is activated or operated by the control device 16 on the basis of an activation based on first control information to generate an energy beam 4a for successive, layered, selective solidification of a construction material layer.

The control device 16 is furthermore designed to generate second control information in order to control the operation of at least one second irradiation device, that is, the right irradiation device 7 in the figure, on the basis of which the second irradiation device generates a second energy beam 4b for the thermal pre-treatment of a construction material layer to be selectively solidified, particularly in a region of the construction material layer to be selectively solidified, and/or a second energy beam 4b for the thermal post-treatment of a construction material layer to be selectively solidified, particularly in a region of the construction material layer to be selectively solidified. The irradiation device 7 defined by the control device 16 as a second irradiation device is activated or operated by the control device 16 on the basis of an activation based on second control information to generate an energy beam 4b for the thermal pre-treatment of a construction material layer to be selectively solidified, particularly in a region of the construction material layer to be selectively solidified, and/or an energy beam 4b for the thermal post-treatment of a construction material layer to be selectively solidified, particularly in a region of the construction material layer to be selectively solidified.

The device 1 thus makes it possible to selectively "allocate" different irradiation devices 6 and 7 with different functions on the basis of corresponding control information generated by the control device 16. One (or more) irradiation device 6 can be defined or operated as a first irradiation device, so that it generates an energy beam 4a for the selective solidification of a construction material layer, while one (or more) other irradiation device 7 can be defined or operated as a second irradiation device, so that it generates an energy beam 4b for the thermal pre-treatment or post-treatment ("temperature control") of a construction material layer.

The possibility of using an irradiation device, that is, the irradiation device 7, for temperature control of construction material layers that is thus created allows for selective and local temperature control of construction material layers and selective control of the heating and cooling conditions or of a selective control of the melting and solidification conditions of the construction material 3. The selective control of the heating and cooling conditions or of the melting and solidification conditions can have active influence on the structural properties of an object 2 to be produced, since a specific structure can be adjusted in this way.

A respective definition of the irradiation devices 6 and 7 as a first or second irradiation device can be varied; that is, is in no way permanently specified. The control device 16 is thus designed to define one specific irradiation device 6 and 7 as a first irradiation device, as part of the selective solidification of a first construction material layer, and to define and accordingly operate the same irradiation device 6 and 7 as part of the selective solidification of an additional construction material layer that is different from the first construction material layer, as a second irradiation device. The control device 16 is also designed to define and operate a specific irradiation device 6 and 7 as a first irradiation device, as part of the selective solidification of a first region of a construction material layer, and to define and accordingly operate the same irradiation device 6 and 7 as part of the selective solidification of an additional region of the construction material layer that is different from the first region of the construction material layer, as a second irradiation device. An irradiation device 6 and 7 can thus be used as part of the processing of one and the same construction process one or more times as a first irradiation device, that is, for the selective solidification of a construction material layer, and one or more times as a second irradiation device, that is, for temperature control of a construction material layer.

A "first irradiation device" in the following refers to an irradiation device 6 and 7 that is actuated or operated at least temporarily by the control device 16 as a first irradiation device. In a similar manner, a "second irradiation device" in the following refers to an irradiation device 6 and 7 that is actuated or operated at least temporarily by the control device 16 as a second irradiation device.

As can be seen based on FIG. 2 ff, showing a schematic depiction of a plurality of energy beams 4a and 4b guided over a construction material layer, the control device 16 is designed to generate second control information, on the basis of which a second energy beam 4b generated by a second irradiation device is guided leading or tailing a second energy beam 4a generated by second irradiation device, having a defined, particularly synchronized local and/or temporal lead (see FIG. 2) or tailing (see FIG. 3), along the same trajectory (see the movement vectors indicated by the arrows) over the construction material layer. Consequently, a second energy beam 4b can be guided leading a first energy beam 4a having a specific local and/or temporal lead (indicated in FIG. 2 by the symbols "+Δx" for the local lead and "+Δt" for the temporal lead) along the same trajectory over a construction material layer, whereby a pre-temperature controlling that is selectively controllable, particularly by the specific local and/or temporal lead of the second energy beam 4b, of the construction material 3 that is to be solidified by the first energy beam 4a results, such as for purposes of controlled influence or control of the heating or melting behavior of the construction material 3. A corresponding lead is shown in FIG. 2.

Alternatively or in addition, a second energy beam 4b can be guided tailing a first energy beam 4a having a specific local and/or temporal tailing (indicated in FIG. 3 by the symbols "−Δx" for the local tailing and "−Δt" for the temporal tailing) along the same trajectory over a construction material layer, whereby a post-temperature controlling that is selectively controllable, particularly by the specific local and/or temporal tailing of the second energy beam 4b, of the construction material 3 that is to be solidified by the first energy beam 4a results, such as for purposes of controlled influence or control of the cooling or solidification behavior of the construction material 3. A corresponding tailing is shown in FIG. 3, whereby it is shown with dashes that a corresponding lead would also be optionally possible here in addition.

Figure 5:
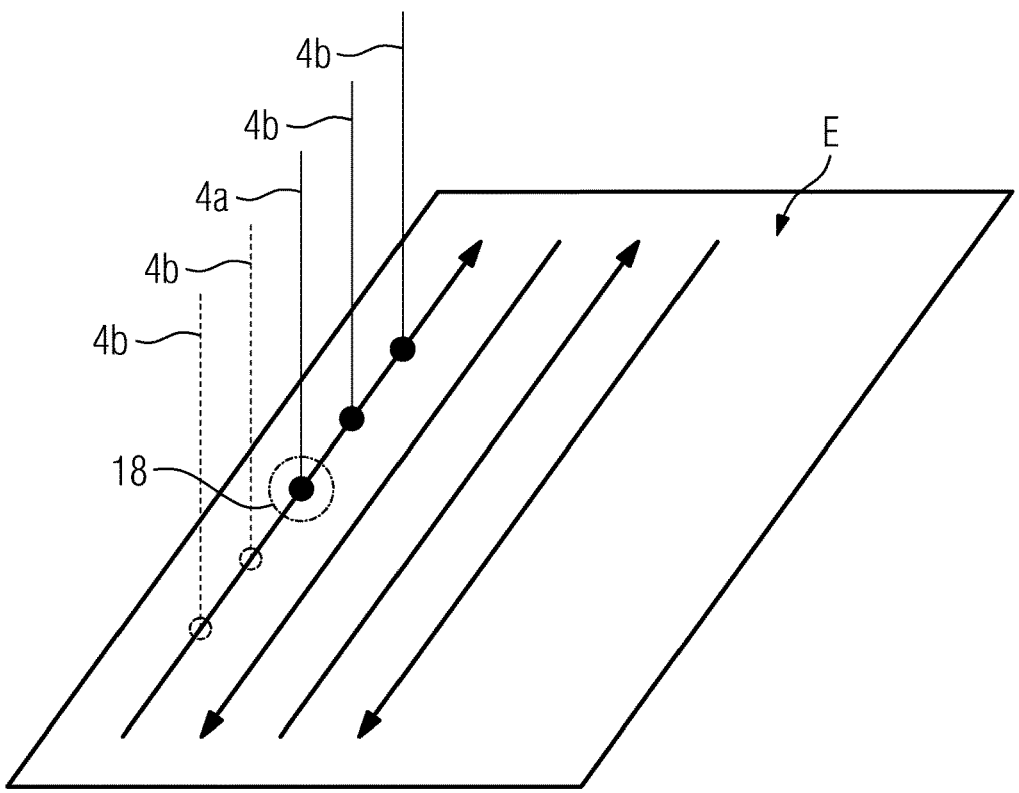

The same applies for the case shown in FIG. 5 in which the device 1 comprises a plurality of irradiation devices operable or operated as second irradiation devices 6 and 7. In this case, the control device 16 can be designed to generate second control information, on the basis of which second energy beams 4b generated by respective second irradiation devices can be guided or are guided leading or tailing a first energy beam 4a, having a defined, particularly synchronized local and/or temporal lead or tailing, along the same trajectory over a construction material, like the first energy beam 4a. Similar to FIG. 3, an optional tailing is shown with dashes.

The control device 16 can be designed to control the energy input, which is introduced into a construction material layer, of second energy beams 4b generated by respective second irradiation devices in dependence on the local and/or temporal lead or tailing of the respective second energy beams 4b to the first energy beam 4a generated by the first irradiation device. The energy input that is introduced into the construction material layer by respective second energy beams 4b is thus (nearly) arbitrarily variable, and therefore (nearly) arbitrarily variable or (nearly) arbitrarily varied temperature profiles, that is, evenly or unevenly rising or falling temperature ramps, can be implemented via a controlling of the respective energy input of respective second energy beams.

Figure 4:
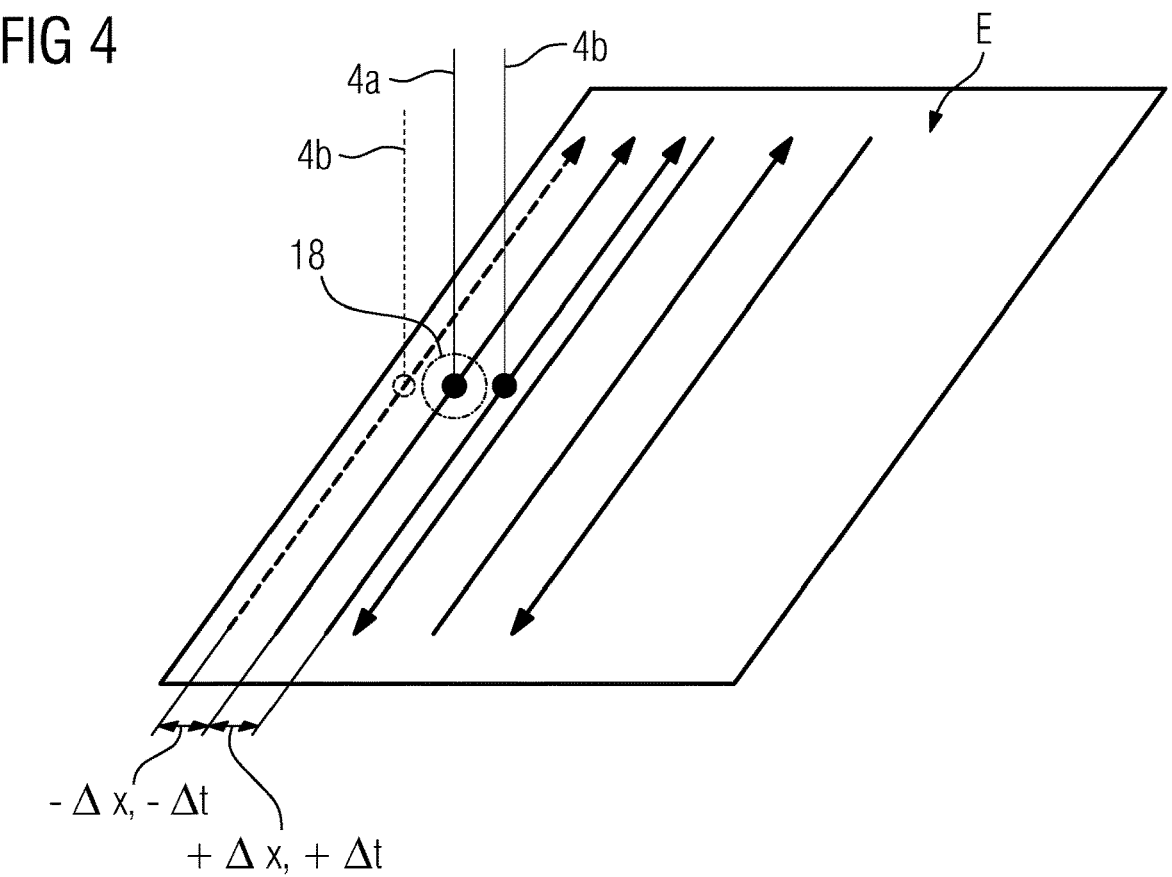

FIG. 4 describes a likewise conceivable variant, according to which a movement of first and second energy beams 4a and 4b occurs in different trajectories, wherein at least one second energy beam 4b is guided laterally, particularly parallel, offset to a first energy beam 4a having a specific local and/or temporal offset (indicated in FIG. 4 by the symbols "+Δx" for the local offset and "+Δt" for the temporal offset to the right of the trajectory of the first energy beam 4a and by the symbols "−Δx" for the local offset and "−Δt" for the temporal offset to the left of the trajectory of the first energy beam 4a).

The control device 16 can thus be designed to generate second control information on the basis of which a second energy beam 4b generated by a second irradiation device is guided over the construction material layer having a defined local and/or temporal offset laterally, particularly parallel, offset to a trajectory, along which a first energy beam 4a is guided over a construction material layer. A second energy beam 4b can thus be guided having a specific local and/or temporal offset that is laterally offset to the trajectory of a first energy beam 4a over a construction material layer, whereby a pre-temperature or post-temperature controlling that is selectively controllable, particularly by the specific local and/or temporal lateral offset of the second energy beam 4b, of the construction material 3 that is to be solidified or is solidified by the first energy beam results, such as for purposes of controlled influence or control of the heating or melting behavior of the construction material or the cooling or solidification behavior of the construction material 3.

The same applies in turn for the case in which the device 1 comprises a plurality of irradiation devices 6 and 7 operable or operated as second irradiation devices. In this case, the control device 16 is designed to generate second control information on the basis of which the second energy beams 4b generated by respective second irradiation devices are guided over the construction material layer having a defined local and/or temporal offset laterally, particularly parallel, offset to a trajectory, along which a first energy beam 4a is guided over a construction material layer.

Here as well, the control device 16 can be designed to control the energy input, which is introduced into a construction material layer, of respective second energy beams 4b in dependence on the local and/or temporal offset of the respective second energy beams 4b to the trajectory of the first energy beam 4a. The energy input that is introduced into the construction material layer by respective second energy beams 4b is also thus (nearly) arbitrarily variable, and therefore (nearly) arbitrarily variable or (nearly) arbitrarily varied temperature profiles, that is, evenly or unevenly rising or falling temperature ramps, can be implemented via a suitable controlling of the respective energy input of respective second energy beams 4b.

In general, it applies that a second energy beam 4b differs from a first energy beam 4a in at least one energy beam parameter influencing the energy input of the energy beam 4b into a construction material layer. The second energy beam 4b can differ from the first energy beam 4a, for example, in the energy beam intensity and/or the energy beam focus diameter, and/or the energy beam velocity at which the energy beam 4b is guided over a construction material layer. The difference in the energy input typically occurs with the stipulation that the energy input of a second energy beam 4b is so low that a melting of construction material 3 is impossible with the second energy beam 4b.

Returning to FIG. 1, it is evident that the device 1 can comprise a detection device 17, designed as a camera device, for example, which is designed to detect at least one property of a construction material layer, particularly a region of a construction material layer that is to be selectively solidified or is selectively solidified, and to generate detection information describing the at least one detected property of the construction material layer. A corresponding property can be, for example, the temperature or the aggregate condition, particularly the molten state, of a region that is to be selectively solidified or that is selectively solidified, so that a local melting bath 18 (see FIG. 2f) can be detected by the detection device 17.

The control device 16 can be designed to control at least one energy beam parameter, which influences the energy input of a respective energy beam into a construction material layer, of a second energy beam 4b generated in dependence on a property, described by detection information, of a construction material layer. By means of properties of a construction material layer described by corresponding detection information, an even more precisely controlled influence or control of the heating or melting behavior or the cooling or solidification behavior of the construction material layer can be implemented by means of one or more second energy beams 4b, particularly in real time.

The device 1 shown in FIG. 1 allows a method for the additive production of three-dimensional objects 2 by successive, layered, selective irradiation and accompanying successive, layered, selective solidification of construction material layers of a construction material 3 that can be solidified by means of an energy beam 4a, wherein a plurality irradiation devices 6 and 7 are used, to be implemented. The method is characterized in that a first irradiation device is operated on the basis of first control information generated by a control device 16 in order to generate a first energy beam 4a for the successive, layered, selective solidification of a construction material layer, and a second irradiation device on the basis of second control information generated by a control device 16 in order to generate a second energy beam 4b for the thermal pre-treatment of a construction material layer to be selectively solidified, particularly in a region of the construction material layer to be selectively solidified, and/or a second energy beam 4b for the thermal post-treatment of a construction material layer to be selectively solidified, particularly in a region of the construction material layer to be selectively solidified.

The invention claimed is:

1. A method of additively manufacturing a three-dimensional object, the method comprising:
  emitting a first energy beam from a first irradiation device along a first trajectory, the first energy beam configured to selectively solidify a respective one of a plurality of sequential layers of a construction material, the first irradiation device including an energy beam deflection device;
  emitting one or more second energy beams from one or more of a plurality of second irradiation devices, the one or more second energy beams configured to provide a designated thermal pre-treatment and/or a designated thermal post-treatment of the respective one of the plurality of sequential layers of the construction material, each of the plurality of second irradiation devices including a respective energy beam deflection device;
  controlling the first irradiation device and the one or more of the plurality of second irradiation devices via a control device, the control device configured to generate control information based on the designated thermal pre-treatment and/or the designated thermal post-treatment, the control information defining at least one of a local distance offset of the one or more second energy beams relative to a position of the first energy beam and/or defining a temporal offset of at least one of the one or more second energy beams relative to the first energy beam; and
  controlling, via the control device, an energy input of the designated thermal pre-treatment and/or the designated thermal post-treatment to the respective one of the plurality of sequential layers of the construction material based at least in part on the defined local distance offset and/or the defined temporal offset,
  wherein the designated thermal pre-treatment and/or the designated thermal post-treatment is based on at least one specified thermal condition for the respective one of the plurality of sequential layers of the construction material, the at least one specified thermal condition including at least one of a heating condition, a cooling condition, a melting condition, and/or a solidification condition of the construction material,
wherein the control information is further configured to control the one or more of the plurality of second irradiation devices independently from the first irradiation device based on which at least one of the one or more second energy beams generated by respective second irradiation devices is guided to lead or tail the first energy beam generated by the first irradiation device, according to local lead or tailing based on the defined local distance offset and/or a defined temporal lead or tailing based on the defined temporal offset, along a same trajectory as the first trajectory over the respective one of the plurality of sequential layers of the construction material that is to be selectively solidified or is selectively solidified, and
wherein the control device controls the energy input into the respective one of the plurality of sequential layers of the construction material by the one or more second energy beams generated by the respective second irradiation devices according to the defined local lead or trailing and/or the defined temporal lead or tailing of the respective one or more second energy beams relative to the first energy beam generated by the first irradiation device.

2. The method of claim 1, wherein the control device is configured to generate first control information, the first control information configured to control the first irradiation device.

3. The method of claim 1, wherein the local distance offset and/or the temporal offset comprises a lateral offset relative to the first trajectory.

4. The method of claim 1, wherein the first energy beam and the one or more second energy beams differ from one another with respect to three or more beam parameters, the three or more beam parameters influencing the energy input to the construction material.

5. The method of claim 4, wherein the three or more beam parameters comprise: beam intensity, beam focus diameter, and beam velocity over a surface of the construction material.

6. The method of claim 1, comprising:
detecting, with a detection device, at least one property of the respective one of the plurality of sequential layers of the construction material; and
generating, with the detection device, detection information describing the at least one property of the respective one of the plurality of sequential layers of the construction material.

7. The method of claim 6, wherein the control device is configured to control at least one beam parameter of the one or more second energy beams based at least in part on the detection information to provide the designated thermal pre-treatment and/or the designated thermal post-treatment.

8. The method of claim 1, wherein the energy input to the construction material from a first second energy beam exceeds the energy input to the construction material from an additional second energy beam.

9. The method of claim 1, wherein the local distance offset and/or the temporal offset of a first second energy beam exceeds the local distance offset and/or the temporal offset of an additional second energy beam.

10. The method of claim 1, wherein, for a first respective one of the plurality of sequential layers of the construction material, the method comprises:
emitting the first energy beam from the first irradiation device, with the first energy beam being configured to selectively solidify the first respective one of the plurality of sequential layers of the construction material; and
emitting the one or more second energy beams from the one or more of the plurality of second irradiation devices, with the one or more second energy beams configured to provide the designated thermal pre-treatment and/or the designated thermal post-treatment of the first respective one of the plurality of sequential layers of the construction material; and
wherein, for a second respective one of the plurality of sequential layers of the construction material, the method comprises:
emitting the first energy beam from the first irradiation device, with the first energy beam configured to provide the designated thermal pre-treatment and/or the designated thermal post-treatment of the second respective one of the plurality of sequential layers of the construction material; and
emitting the one or more second energy beams from the one or more of the plurality of second irradiation devices, with the one or more second energy beams being configured to selectively solidify the second respective one of the plurality of sequential layers of the construction material.

11. The method of claim 1, wherein, for a first region of a respective one of the plurality of sequential layers of the construction material, the method comprises:
emitting the first energy beam from the first irradiation device, with the first energy beam being configured to selectively solidify the first region of the respective one of the plurality of sequential layers of the construction material; and
emitting the one or more second energy beams from the one or more of the plurality of second irradiation devices, with the one or more second energy beams configured to provide the designated thermal pre-treatment and/or the designated thermal post-treatment of the first region of the respective one of the plurality of sequential layers of the construction material; and
wherein, for a second region of the respective one of the plurality of sequential layers of the construction material, the method comprises:
emitting the first energy beam from the first irradiation device, with the first energy beam configured to provide the designated thermal pre-treatment and/or the designated thermal post-treatment of the second region of the respective one of the plurality of sequential layers of the construction material; and
emitting the one or more second energy beams from the one or more of the plurality of second irradiation devices, with the one or more second energy beams being configured to selectively solidify the second region of the respective one of the plurality of sequential layers of the construction material.

* * * * *